(12) United States Patent
Gaiser et al.

(10) Patent No.: US 11,979,537 B1
(45) Date of Patent: May 7, 2024

(54) INCORPORATION OF SOURCE-IDENTIFYING INFORMATION IN SCANNED DOCUMENTS

(71) Applicant: Xerox Corporation, Norwalk, CT (US)

(72) Inventors: Paul Louis Jacques Gaiser, Wilnis (NL); Kevin John Kopp, Mississauga (CA); Bindu Bhaumik Choksi, Mumbai (IN); Timothy Allen Beardslee, Conesus, NY (US); Marcel Wisman, Tiel (NL)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/199,569

(22) Filed: May 19, 2023

(51) Int. Cl.
*H04N 1/32* (2006.01)
*H04N 1/00* (2006.01)

(52) U.S. Cl.
CPC ..... *H04N 1/32331* (2013.01); *H04N 1/00846* (2013.01); *H04N 2201/323* (2013.01)

(58) Field of Classification Search
USPC ....................................................... 358/3.28
See application file for complete search history.

(56) References Cited

U.S. PATENT DOCUMENTS

| | | | |
|---|---|---|---|
| 5,515,451 A | 5/1996 | Tsu et al. | |
| 5,864,742 A | 1/1999 | Gasper et al. | |
| 6,272,245 B1 | 8/2001 | Lin | |
| 2004/0061326 A1 | 4/2004 | Hilton | |
| 2004/0158724 A1 | 8/2004 | Carr et al. | |
| 2008/0130945 A1 | 6/2008 | Rhoads et al. | |
| 2010/0128290 A1* | 5/2010 | Fan ........................ | B42D 25/29 358/1.9 |
| 2010/0128299 A1* | 5/2010 | Fan .................... | H04N 1/32229 358/1.14 |

* cited by examiner

*Primary Examiner* — Jacky X Zheng
(74) *Attorney, Agent, or Firm* — Lippes Mathias LLP

(57) ABSTRACT

An embedding component is described which embeds information in a scanned document. The embedding component includes a document acquisition component, which acquires a scanned document from an associated scanning device. An information acquisition component acquires variable information associated with the scanned document. An encoding component generates a machine-readable representation of the variable information. A pattern insertion component uses the machine-readable representation to insert at least one machine readable pattern in the scanned document, to generate a modified document. An output component outputs the modified document to an associated output device, such that when the modified document is rendered on print media, the machine-readable pattern is not noticeable to the unaided eye of a person. A processor implements the document acquisition component, information acquisition component, encoding component, pattern insertion component, and output component.

20 Claims, 6 Drawing Sheets

INCORPORATION OF SOURCE-IDENTIFYING INFORMATION IN SCANNED DOCUMENTS

BACKGROUND

The exemplary embodiment relates to a method of incorporating information in a document when the document is scanned. The information can be used for security purposes, such as identifying the source of the scanned document, or for uniquely marking a confidential document before making it available to a recipient.

For security purposes, it is often desirable to embed information in physical documents which is not visible to the naked eye but which can be detected by other means. This may be achieved, for example, using a pattern of small dots, which may be repeated in a document. The dots may be in a yellow color, to reduce their visibility. The pattern can be detected using suitable equipment and information extracted from the pattern. This may be used, for example, for document identification or authenticity verification, e.g., for bank notes, security instruments, and the like.

However, such patterns do not provide variable information which allows tracing the source of a scanned document.

INCORPORATION BY REFERENCE

The following references, the disclosures of which are incorporated herein by reference in their entireties, are mentioned.

U.S. Pat. No. 5,515,451A, entitled IMAGE PROCESSING SYSTEM FOR SELECTIVELY REPRODUCING DOCUMENTS, issued May 7, 1996, by Tsu, et al., describes an image processing system which recognizes a circular image of a specific color which is present in an image in an original document.

U.S. Pat. No. 5,864,742A, entitled COPY RESTRICTIVE SYSTEM USING MICRODOTS TO RESTRICT COPYING OF COLOR-REVERSAL DOCUMENTS, issued Jan. 26, 1999, by Gasper, et al., describes a system for restricting the copying of a color-reversal document having one or more microdots embedded in the color-reversal document.

U.S. Pat. No. 6,272,245 B1, issued Aug. 7, 2001, entitled APPARATUS AND METHOD FOR PATTERN RECOGNITION, by Lin, describes a method for identifying forgeries.

U.S. Pub. No. 20040061326A1, published Apr. 1, 2004, entitled DOCUMENT PRINTED WITH GRAPHICAL SYMBOLS WHICH ENCODE INFORMATION, by Hilton, describes printing a document with graphical symbols which encode information but which are not human readable. The graphical symbols are formed into an element which is human readable.

U.S. Pub. No. 20040158724A1, published Aug. 12, 2004, entitled DIGITAL WATERMARKING FOR IDENTIFICATION DOCUMENTS, by Carr, et al., describes a method of verifying an age of a bearer of a document. The document includes auxiliary data embedded in the document that includes an age indicator and a biometric indicator.

U.S. Pub. No. 20080130945 A1, published Jun. 5, 2008, entitled SECURE DOCUMENTS WITH HIDDEN SIGNALS, AND RELATED METHODS AND SYSTEMS, by Rhoads, et al., describes a printed security document including artwork with a security pattern having the form of a line structure in which line width and/or line spacing is adjusted to carry predefined data.

BRIEF DESCRIPTION

In accordance with one aspect of the exemplary embodiment, an embedding component for embedding information in a scanned document includes a document acquisition component, which acquires a scanned document from an associated scanning device, an information acquisition component, which acquires variable information associated with the scanned document, an encoding component, which generates a machine-readable representation of the variable information, a pattern insertion component, which uses the machine-readable representation to insert at least one machine readable pattern in the scanned document, to generate a modified document, an output component which outputs the modified document to an associated output device, such that when the modified document is rendered on print media, the machine-readable pattern is not noticeable to the unaided eye of a person. A processor implements the document acquisition component, information acquisition component, encoding component, pattern insertion component, and output component.

The output device may generate a hardcopy of the output document or may output the output document in digital form.

The variable information may include at least one of a user identifier and a device identifier, the device identifier identifying at least one of the scanning device and the output device, and optionally may include date information.

The variable information may include at least the user identifier.

The machine-readable representation of the variable information may include a template for the machine-readable pattern. The template may include an arrangement of small shapes. The small shapes may include dots.

The modified document may include a plurality of the machine-readable patterns. Each machine-readable pattern may include an arrangement of yellow dots. Each machine-readable pattern may include at least five dots and/or up to fifteen dots.

The embedding component may further include a data structure, which associates each of a plurality of unique datum values with a respective predefined arrangement of dots and the encoding component may access the data structure to identify unique datum values that correspond to portions of the variable data and build the representation from the respective predefined arrangements of dots.

The scanned document may have been generated by scanning an original document which lacks machine-readable security information.

In accordance with another aspect of the exemplary embodiment, an embedding system may include the embedding component described above, the scanning device, and the output device.

The output device of the embedding system may include a printer which renders the modified document on print media or a device which outputs the output document in a digital form, which may be printed on a remote device.

In accordance with another aspect of the exemplary embodiment, an embedding method for embedding information in a document includes acquiring a scanned document derived from a first hardcopy document, acquiring variable information associated with the scanned document, generating a machine-readable representation of the variable information, using the machine-readable representation, inserting at least one machine readable pattern in the scanned document, to generate a modified document, and outputting the modified document to an output device, such that when the modified document is rendered on print media, the machine-readable pattern is not noticeable to the unaided eye of a person.

The generating of the machine-readable representation may include accessing a data structure which associates each of a plurality of unique datum values with a respective predefined arrangement of dots to identify unique datum values that correspond to portions of the variable data and building the representation from the respective predefined arrangements of dots.

The inserting of the at least one machine readable pattern in the scanned document may include embedding patterns in a color separation of the scanned document, each of the patterns including an arrangement of small shapes.

In accordance with one aspect of the exemplary embodiment, an analysis device for detecting information embedded in a document includes an acquisition component, which acquires a digital document from an associated document acquisition device, the digital document being derived from an original hardcopy document, an information acquisition component, which acquires variable information associated with the digital document, a detection component, for identifying candidate patterns of dots in the digital document which each comply with rules for identifying a candidate pattern, a decoding component which, for an identified candidate pattern, attempts to match the candidate pattern with one or more sequences of dots stored in a data structure, and if a match is found, decodes the pattern, a response component which, for a decoded pattern, determines a response, based on the decoded pattern and any stored response instructions, and an output component which outputs the response to an appropriate device for executing the response. A processor implements the components.

In the analysis device, the rules may include rules for determining whether an arrangement of small shapes meets predetermined ranges encompassing the expected size, shape, arrangement, and number of dots of a true pattern.

DETAILED DESCRIPTION

A system and method are described which embed variable information in a scanned document to provide traceability, such as information which enables identification of where the document was scanned, the identity of a device on which the document was scanned, a user identifier, date information, such as a day/time of embedding, combination thereof, or the like, in a manner which is not noticeable to the unaided eye of a user of the document.

Figure 1:
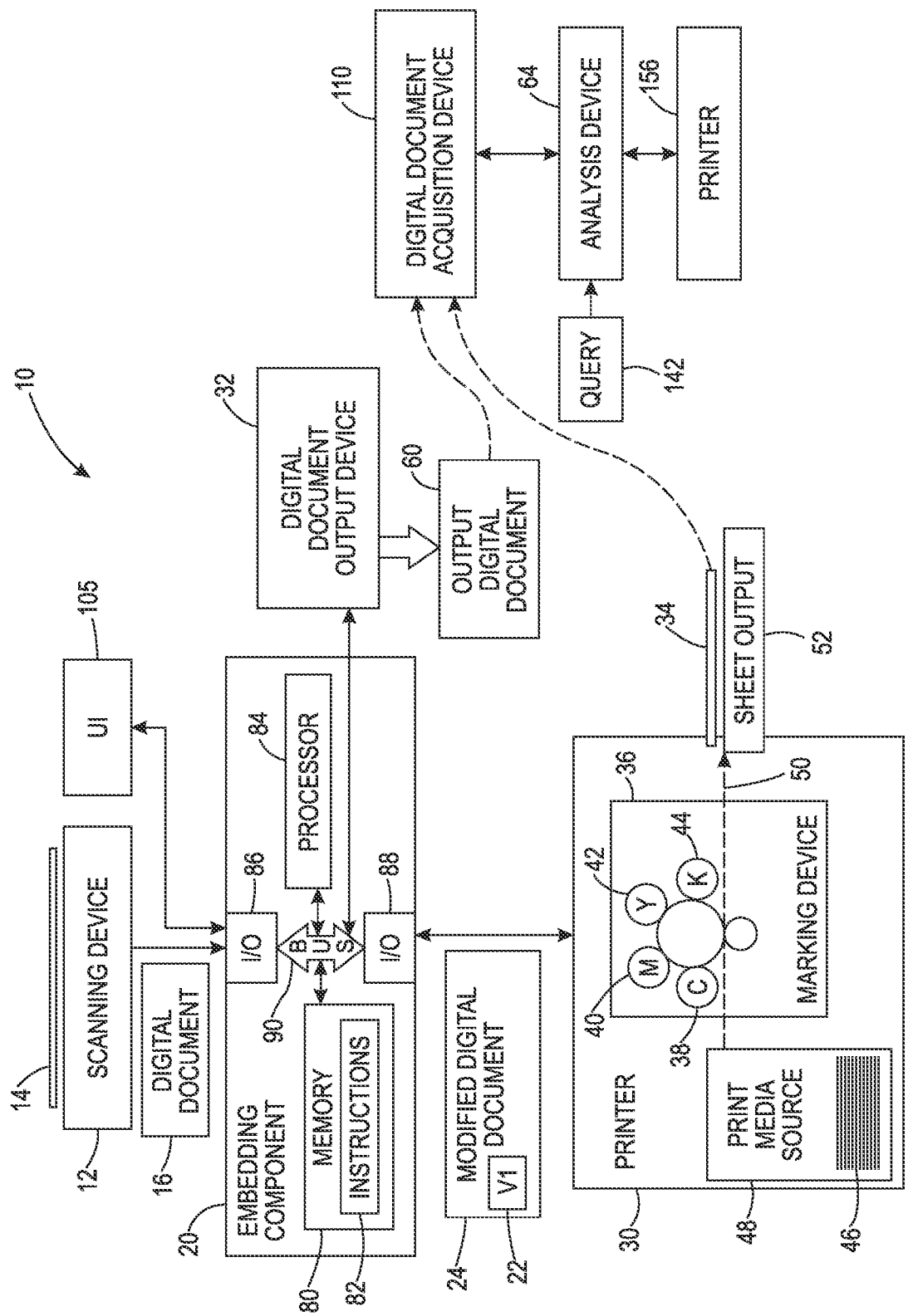
FIG. 1 is functional block diagram of a system for embedding information in a scanned document, in accordance with one aspect of the exemplary embodiment.

With reference to FIG. 1, a system 10 configured for embedding information in a scanned document includes a scanning device 12, which is configured for scanning a physical document 14, composed of one or more sheets of paper or other physical media, to generate a digital document 16, such as a .pdf file. The digital document 16 includes one or more scanned images, e.g., one for each page of the physical document 14 that has been scanned, which may be one per sheet if the document is scanned single sided, or two per sheet if both sides of each sheet are scanned (duplex scanning). The scanning device may be a conventional full width array scanner in which the hardcopy is moved relative to an array of LED (or other) lights (or vice versa) with the light reflected from the hardcopy being collected and used to generate a scanned image of the scanned document 16.

The embedding system 10 also includes an embedding component 20, which receives the digital document 16 from the scanning device and embeds variable information (VI) 22 in one or more of the pages of the digital document to form a modified digital document 24.

The embedding system 10 may further include, or be associated with, one or more output devices, such as a printer 30, or a digital output device 32, such as a faxing component, scan to email device, USB port, wired or wireless output, or combination thereof. In the case of a printer 30, the printer receives the modified digital document 24 containing the variable information 22 and renders one or more physical copies 34 of the modified digital document. Printing entails rendering the modified scanned images in the modified digital document 24 with a marking device 36, using colorants 38, 40, 42, 44, such as inks or toners, on sheet(s) 46 of print media, such as standard letter size or A4 sheets. The sheets are supplied to the marking device 36 from a print media source 48, such as a paper tray, on a paper path 50, composed of conveyor belts, airjets, or the like. The printed sheets forming the physical document 34 are output to a sheet output device 52.

In the case of a digital output device, such as a faxing component 32, a digital document 50 that is output may be the modified digital document 24 or digital document derived therefrom in a suitable form for exporting. The output digital document 50 may subsequently be printed, e.g., at a remote location, on a printing device analogous to printer 30.

To a person receiving the physical document 34, the printed sheets are indistinguishable from those of a corresponding document formed without the embedded information 22. By this it is meant that under normal illumination, e.g., daylight, a person with 20/20 vision, looking at the document, will not observe the patterns with the naked (unaided) eye. However, when examined by a suitable analysis device 64, an embedded pattern is detectable. Similarly, a person viewing the modified digital document 24 displayed on a standard display device, such as a screen of a personal computing device, such a laptop, smartphone, or tablet, will not notice the pattern of dots when viewing in the normal manner.

Figure 2:
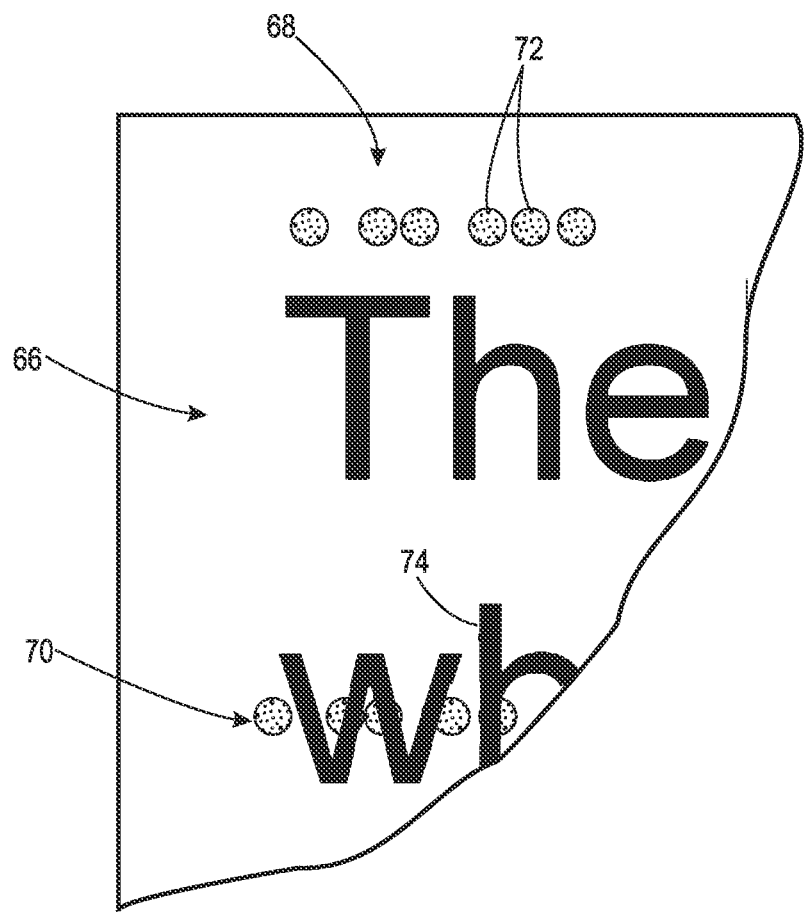
FIG. 2 graphically illustrates a digital or printed document containing patterns of small dots, in accordance with another aspect of the exemplary embodiment.

FIG. 2 illustrates a greatly-enlarged portion of a printed (or digital) page 66 of the document 34 (not necessarily to scale). The page includes a machine-readable pattern 68, 70 composed of a set of small shapes 72, such as dots, which encodes the variable information 22. The dots 72 forming the patterns 68, 70 are small enough and suitably colored to be invisible to the unaided eye in the printed document. In one embodiment, the yellow separation is used as the color for the dots, since the human eye is less sensitive to the yellow part of the visible spectrum than it is to cyan and magenta. The pattern may be repeated two or more times in the page 66, such that at least one pattern 68 is machine readable, while another pattern 70 may be entirely or partially obscured by the viewable content 74 of the page, such as text, graphics, and/or images. In the illustrated embodiment, the dots 72 are circular and of the same size, although other regular and irregular shapes and different sizes of the small shapes 72 forming the pattern are also contemplated. In some embodiments, spaces between dots 72 may also form a part of the encoding, for example, when a binary code is represented by dots for 1's and spaces for 0's, or vice versa. In other embodiments, geometric relations between the dots may form a part of the encoding, e.g., distances between two or more of the dots and/or vectors defined by two or more of the dots. A terminal one of the dots may be used to identify the start/end of the encoding. The pattern may include a sufficient number of the small shapes/spaces and/or geometric relations between the shapes to enable encoding of a source of the printed document, such as an identifier for the printer/scanner or its location, and/or an identifier of the user who scanned the original physical document 14 and/or caused it to be output by the output device 30, 32.

Each dot 72, may be about 1 mm or less, or 0.5 mm, or less in maximum dimension, e.g., about the size of a period in 12 point Arial font. The size of the dots is large enough that they will not disappear when the output document 34 is subsequently scanned on a scanner having a typical resolution. There may be at least five, or at least eight, or up to fifteen dots 72 in each machine-readable pattern.

In some embodiments, the pattern(s) 68 of dots may be used in combination with another security feature, such as a visible watermark, such as a Do Not Copy notice. However, an unauthorized user who notices that a document includes a conventional security feature may attempt to defeat the security feature, e.g., by a copy/paste of the image, to erase traceability. The pattern 68 of dots described herein would not alert the unauthorized user and therefore is much more likely to remain part of the document image going forward.

With reference once more to FIG. 1, the embedding component 20 includes hardware and software for embedding the variable information 22 in the digital document 16 before it is output, in modified form, by one or more of the output devices 30, 32. The illustrated embedding component 20 includes memory 80, which stores software instructions 82 for generating the variable information 22 and embedding it in the digital document 16. A processor 84, in communication with the memory 80, executes the instructions 82. A first input/output (I/O) device 86 of the embedding component 20 receives the digital document 16 from the scanning device 12 and stores the digital document 16 in memory, such as memory 80. A second input/output (I/O) device 88 of the embedding component 20 outputs the modified digital document 24. Hardware components 80, 84, 86, 88 of the embedding component may communicate via a data control bus 90.

As will be appreciated, the embedding component 20 may be separate from the scanning device 12 and printer 30/scanner 32 or may be incorporated, in whole or in part, in the scanning device and/or printer and/or faxing component. In one embodiment, the system 10 is a multifunction device (MFD) which incorporates the scanner, the printer and/or faxing component, and the embedding component 20. In some embodiments, the embedding component may be hosted by a remote computing device, such as a print server, which is in communication with the scanner and/or printer.

The memory 80 may represent any type of non-transitory computer readable medium such as random access memory (RAM), read only memory (ROM), magnetic disk or tape, optical disk, flash memory, or holographic memory. In one embodiment, the memory 80 comprises a combination of random access memory and read only memory. In some embodiments, the processor 84 and memory 80 may be combined in a single chip. Memory 80 stores the instructions 82 for performing the embedding method described below as well as the information to be embedded.

The interfaces 86, 88 allow the embedding component to communicate with other devices via one or more of a cable, a computer network, such as a local area network (LAN) or wide area network (WAN), or the Internet, and may comprise a modulator/demodulator (MODEM) a router, a cable connector, USB port, and/or Ethernet port.

The digital processor device 84 can be variously embodied, such as by a single-core processor, a dual-core processor (or more generally by a multiple-core processor), a digital processor and cooperating math coprocessor, a digital controller, or the like. The digital processor 84, in addition to executing instructions 82 may also control the operation of the scanner 12 and/or output device(s) 30, 32.

The scanner 10 may be any suitable electronic device for capturing an image of a physical document 14. In one embodiment, the scanner directs a light beam towards the physical document, e.g., from an LED bar, and captures the light reflected from the physical document with an array of sensors.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or the like, and is also intended to encompass so-called "firmware" that is software stored on a ROM or the like. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The marking device 30 may be an electrophotographic marking device which includes a charge retentive surface, such as a rotating photoreceptor in the form of a belt or drum. The images are created on a surface of the photoreceptor. Disposed at various points around the circumference of the photoreceptor are xerographic subsystems including developer housings which supply the colorants 38, 40, 42, 44 (four colored toners in the case of CMYK printer) that are used to develop a latent image or images formed on the photoreceptor. At least one of the colorants, e.g., the yellow colorant Y, is used to form the pattern(s) 68, 70 of dots 72 on the print media. Each dot 72 may be composed of an array of halftone dots of a small size so that the color of each dot 72 is substantially the same as the background color of the sheet of print media and/or of the local image content 74 derived from the scanned document page. The marking device may alternatively be an ink-jet marking device or other marking device capable of marking an image on a substrate.

Figure 3:
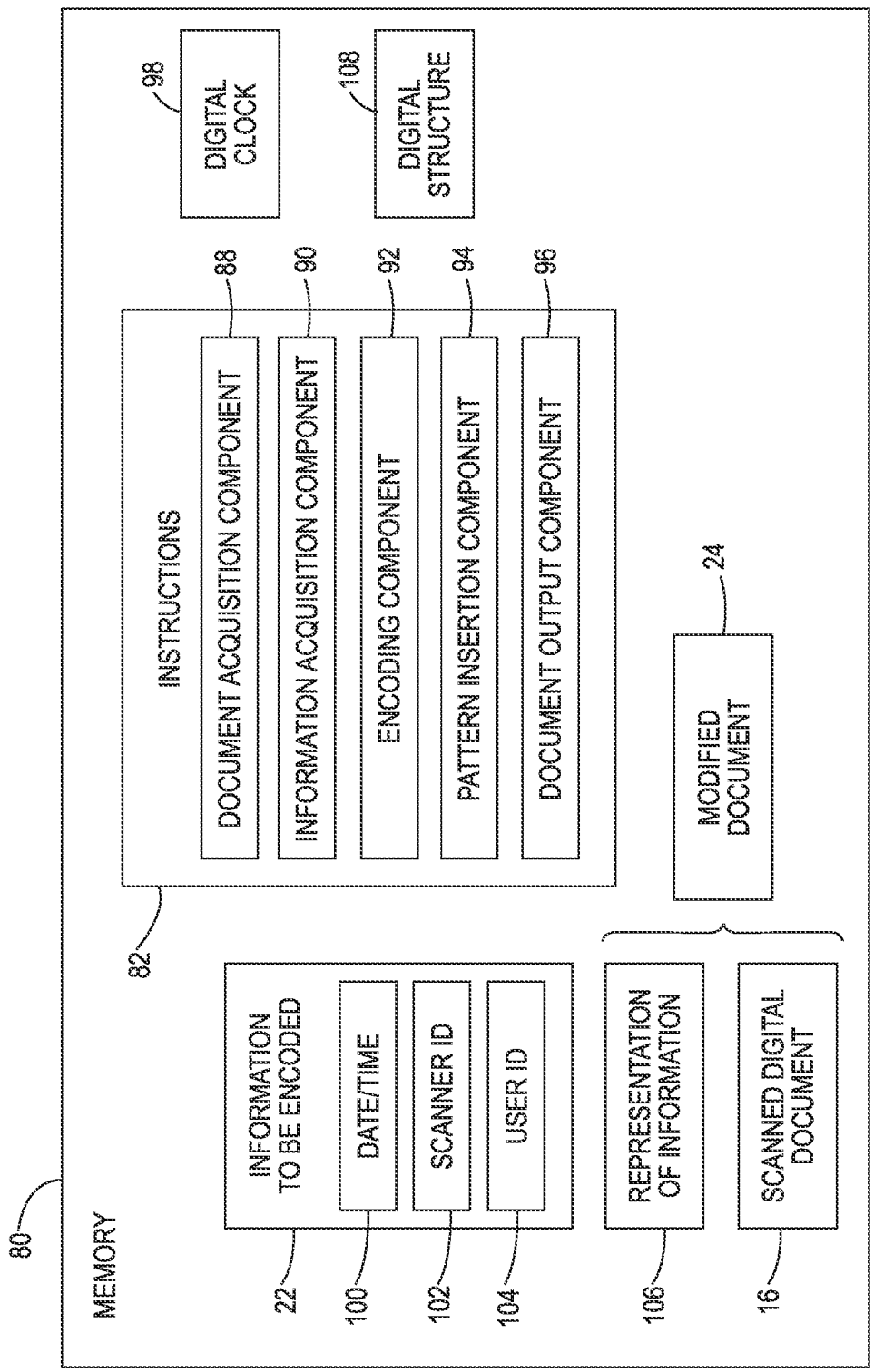
FIG. 3 is functional block diagram of components of the embedding system of FIG. 1.

With reference now to FIG. 3, the instructions 82 may include a document acquisition component 88, an information acquisition component 90, an encoding component 92, a pattern insertion component 94, and a document output component 96.

The document acquisition component 88 acquires a scanned digital document 16 from the scanning device 12. In one embodiment, the digital document may have undergone some preprocessing by a preprocessing component (not shown).

The information acquisition component 90 receives or retrieves variable information 22 to be embedded in the digital document 16. The variable information 22 is linked, in memory 80, to the acquired digital document 16 with which it is associated. The information 22 may include one or more pieces of information which provide(s) traceability to the modified document, such as a device serial number associated with the scanning device 12, a user identifier associated with the person scanning the physical document, a date/time when the physical document was scanned, and combinations thereof. For example, the information acquisition component 90 may access a digital clock 98 to determine a date/time 100 at which the scanned document 16 is received into memory 80. A device identifier 102 may be acquired. The device identifier may be a serial number of the scanning device 12 which scanned the original document 14 and/or of the output device (e.g., printer 30) to be used in printing or otherwise outputting the modified document 24. In the case of a multifunction device, a single serial number associated with the entire MFD may be acquired. If a user is required to input a user identifier 104 before using the scanner and/or printer, the user identifier may be acquired, e.g., input via a keycard on which the user ID is stored, or input via user interface (UI) 105. In various embodiments, the user interface 105 may be equipped with a keypad or a touch pad through which a user inputs a user ID, or with a code reader, such as a bar code or QR code reader with software for automatically acquiring a code presented by the user and associating the code with a stored user ID. In another embodiment, the user interface may be configured to collect biometric data for the user, which can be used to query a database of biometric data associated with different users. For example, a touch pad may be provided with touch recognition and suitable software for associating a stored user ID with features of a user's fingerprint. In another embodiment, the user interface may include a retina scanning device and suitable software for associating a stored user ID with features of a scanned retina of the user ID. In another embodiment, the user interface may include a facial recognition device and suitable software for associating a stored user ID with facial features of a user. In another embodiment, the user interface may include a voice recognition device and suitable software for associating a stored user ID with audible features of a user's voice. In some embodiments, an image, such as an image of the user's face, a retina scan, or fingerprint scan, is converted into a fixed character-length encoding which can be used as the user ID 104. As an example, a trained neural network or a hash function may be used to generate a fixed length encoding of the image. Combinations of user identifying methods may be employed.

The user ID may be a name, an alphanumeric code, an image of the user, biometric data, data derived therefrom, and/or or other data which is unique to the user or to a subset of users.

The encoding component 92 generates a machine-readable representation 106 of the variable information 22. In one embodiment, the representation includes a template for the pattern 68 of dots 72, as exemplified in FIG. 2, or other information from which multiple copies of the pattern can be generated. In one embodiment, the encoding component 92 accesses a data structure 108, such as a look-up table, which associates each of a plurality of unique datum values with a respective predefined arrangement of dots. The representation 106 can then be built up from a set of the predefined arrangements. For example, the datum values may include full words, individual characters, such as letters or numbers, and/or sequences thereof, and combinations thereof.

The pattern insertion component 94 uses the template 106 to insert the pattern(s) 68, 70 into the scanned document 16. The template may be used to insert multiple patterns, i.e., the pattern may be repeated one or more times in the document 24. The pattern insertion component 94 may insert the pattern 68, 70 at regular intervals throughout the document, or at random intervals. In another embodiment, the pattern insertion component 94 identifies blank regions (e.g., blocks of white space) in the digital document 16 and inserts the pattern 68, 70 in one or more of the blank regions.

When the user has selected to output the scanned document 16 to the printer 30, the document output component 96 outputs the modified document 24 with the pattern(s) 68, 70 incorporated therein to the printer for printing. If the user has selected to fax (or email) the scanned document 16, the output component 96 sends the modified document 24 to the fax component 32 (or email server) for outputting to an associated wired or wireless network.

The exemplary embedding component 20 functions automatically, without any need for input from the user who scans the original document 14. The user may be unaware that the variable data 22 has been embedded in the scanned document. The software components 90, 92, 94, 96 of the embedding component 20 may be protected from inspection and/or modification to prevent or inhibit tampering, e.g., with a software vault.

As will be appreciated, other actions may be performed on the scanned document 16, before or after the variable information 22 is embedded, such as conversion from RGB to CMYK or other color space used by the printer, removal of dust spots, straightening of images, color correction, and the like.

In the exemplary embodiment, the output document 34 includes a pattern of yellow dots which are invisible to the unaided eye but which can be read and deciphered by suitable software of the analysis device 64. If the document 34 is subsequently copied, the pattern of dots will also be part of any subsequent printed document.

Figure 4:
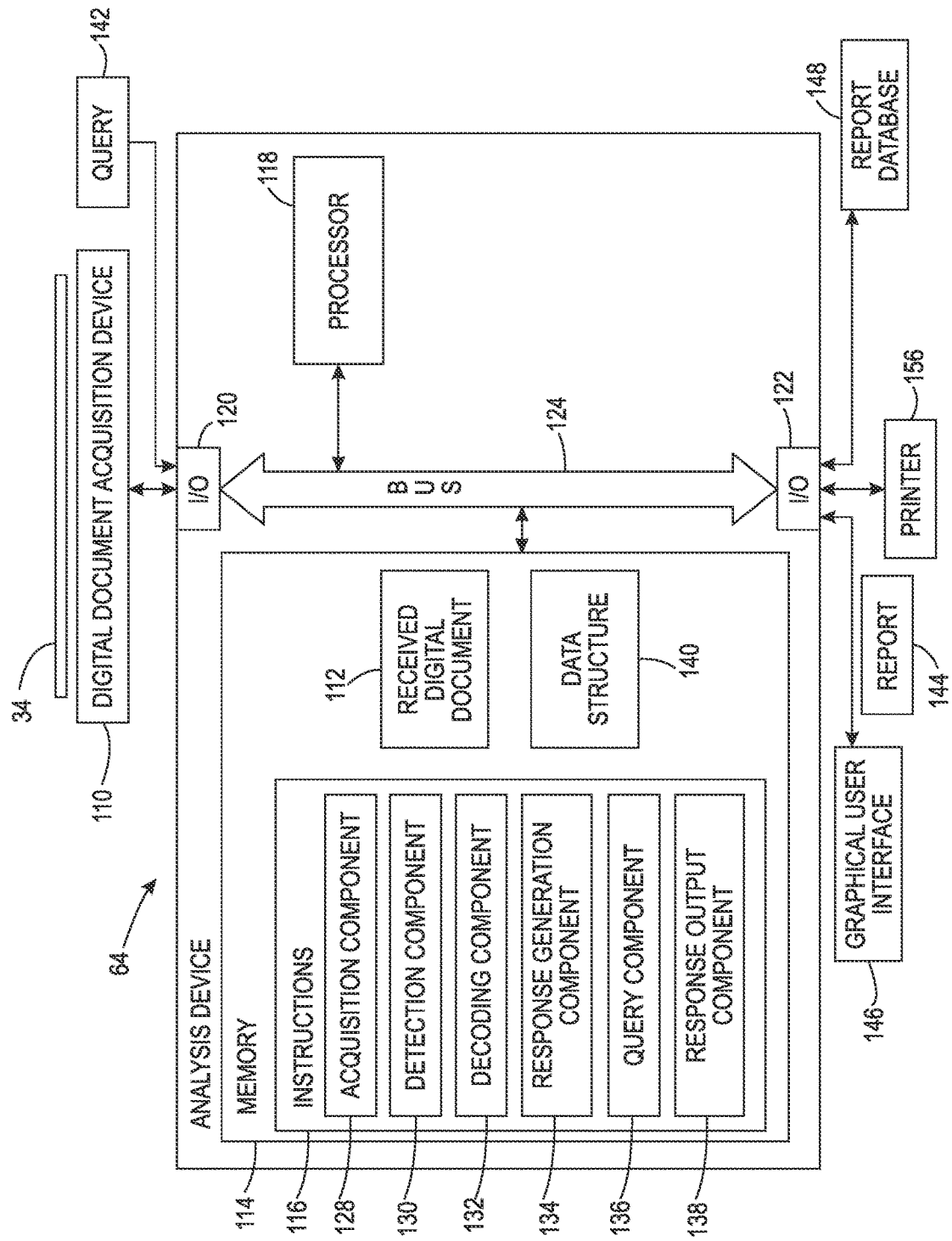
FIG. 4 is functional block diagram of a system for retrieving information from a document as illustrated in FIG. 2, in accordance with another aspect of the exemplary embodiment.

With reference to FIG. 4, the analysis device 64 may include, or be associated with, a digital document acquisition device 110. In one embodiment, the digital document acquisition device 110 is, or includes, a scanning device. The scanning device 110 may be analogous to scanning device 12, or may be configured to use a specific portion of the electromagnetic spectrum, such as blue light, that is chosen to enhance detection of the yellow dots. The scanning device 110 outputs a digital document 112, e.g., a scanned document, which may be temporarily stored in memory 114 of the analysis device 64 while analysis is performed.

In another embodiment, the digital document acquisition device 110 may be configured to acquire a digital document 112, such as output document 60, or a digital document derived therefrom. The digital document acquisition device 110 may acquire the digital document 60 directly from the output device 32. Alternatively, the output document 60 may be transferred to the digital document acquisition device 110 via one or more intermediate document storage devices, such as a USB device, fax machine, computing device, scanner, camera, or the like.

Memory 114 stores software instructions 116 for analyzing the digital document 112 which may be executed by an associated processor 118. Memory 114, processor 118, and associated input/output devices 120, 122 and data/control bus 124 may be configured similarly to the corresponding hardware components of the embedding component 20 of FIG. 1. In one embodiment, memory 114 and processor 118 may be hosted by a server remote from the analysis device 64.

The instructions 116 may include a document acquisition component 128, a detection component 130, a decoding component 132, a response generation component 134, a query reception component 136, and a response output component 138. The document acquisition component 128 acquires the digital image 112, such as a scanned digital document generated from the hardcopy document 34 or the output digital document 60, and stores it in temporary memory. The detection component 130 identifies candidate patterns of dots in the digital image 112 which comply with rules for identifying a candidate pattern, such as rules concerning whether a set of dots are within predetermined ranges encompassing the expected size, shape, arrangement, and number of dots of a true pattern. If a candidate pattern is found, the decoding component 132 attempts to match the candidate pattern with one or more sequences of dots stored in a data structure 140, and if a match is found, decodes the pattern. The response generation component 134 determines a response, based on the decoded pattern and any stored response instructions. The query component 136 receives an input query 142, which seeks to identify documents having specific information embedded in them. The query may be used to provide response instructions to the response generation component. The response output component 138 outputs the response to an appropriate device for executing the response.

For example, the response may include providing a report 144 to an authorized user. The report 144 may include the decoded pattern, when detected (or an indication of a lack thereof). The report may be output to the user via a local graphical user interface 146 or sent to a remote computing device. Thus, an authorized user is able to determine the source of the output document 34, such as the location of the printer, ID of the person who printed the document 34, or caused a digital document 60 to be output, and a date/time at which the document was scanned and/or printed and/or digitally output. This information may be stored with a link to a copy of the digital document 112 or an encryption thereof, such as a hash. The report may be stored in a report database 148 containing multiple such reports which can be accessed through a query 142. The query may include one or more of: the scanner ID 102, the printer ID, the User ID 104, an ID of the output device 32, a time or time period, a copy of the original document, an encryption thereof, a pattern of dots to be matched, and combinations thereof. If a match is found in the report database, the document 34, 60, 112 can be traced back to its source (e.g., to the scanner 12 on which the hardcopy document 14 was scanned, to the output device 30 or 32, and/or to a user associated with the user ID 104. The source may be identified by the analysis device 64, or the report 144 may provide information responsive to the query 142 which allows the source to be identified by an authorized user.

Alternatively, or additionally, the response may be in the form of an action, such as blocking a user from printing the received document 112 on an associated printer 156, optionally accompanied by a human readable or audible notification to the local graphical interface 146. The notification alerts the user that the scanned or otherwise input document cannot be printed by the user.

When no decodable pattern is detected in the received document 112, the response may be to take no action.

Figure 5:
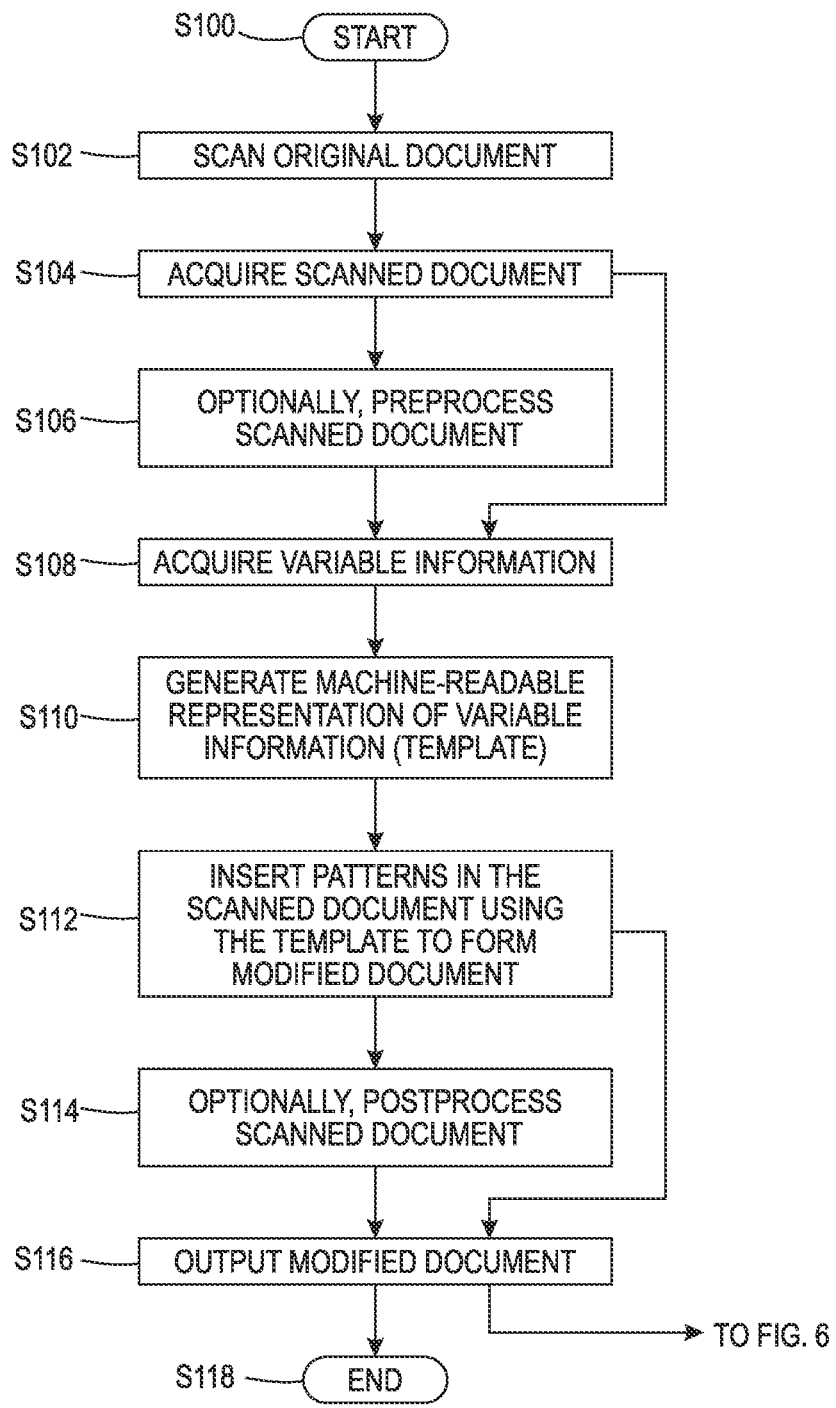
FIG. 5 is a flow chart illustrating an embedding method, in accordance with another aspect of the exemplary embodiment.

With reference to FIG. 5, a method for embedding information in a scanned document, which may be performed with the system 10, is illustrated. The method begins at S100.

At S102, a scanned document 16 is generated when a user scans an original document 14 with a scanning device, such as device 12. In some cases, the scanning of the particular document 14 may be unauthorized, e.g., because the user is not permitted to make copies of the original document. In other embodiments, scanning and printing may be permitted, but the distribution of the document to others, or the removal of printed copies from a secure location may not be permitted or may be limited to some degree.

At S104, the scanned document 16 is acquired by the system 10 and may be stored in memory 80 during processing.

At S106, the scanned document 16 may undergo preprocessing to prepare it for printing. This step may include converting the scanned document from the scanner's color space (e.g., RGB) to the printer's color space (e.g., CMY or CMKY) and using a halftone screen to define halftone dots for each of the color separations suitable for printing. This step may be performed by the system 10 or by an external software component.

At S108, variable information 22 to be embedded in the digital document 16 is acquired, e.g., by the information acquisition component 90. The variable information 22 may include one or more pieces of information which provide(s) traceability to the modified document, such as the date/time 100, the printer, scanner, or MFD ID 102, and a user ID 104. Some of the variable information may be generated by the information acquisition component 90, e.g., a time stamp 100, GPS information identifying a location of the printer, while other information may be acquired from external devices, such as the printer, or a user, e.g., via a keycard entry, password entry on the UI, or the like. The information 22 may include such as a device serial number associated with the scanning device 12, a user identifier associated with the person scanning the physical document, a date/time when the physical document was scanned, and combinations thereof. For example, the information acquisition component 90 may access a digital clock 98 to determine a date/time 100 at which the scanned document 16 is received into memory 80. A device identifier 102 may be acquired. The device identifier may be a serial number of the scanning device 12 which scanned the original document 14 and/or the output device (e.g., printer 30) to be used in printing or otherwise outputting the modified document 24. In the case of a multifunction device, a single serial number associated with the entire MFD may be acquired. If a user is required to input a user identifier 104 before using the scanner and/or printer, the user identifier may be acquired, e.g., from the UI 105.

At S110, a machine-readable representation 106 of the variable information 22 is generated, e.g., by the encoding component 92, such as a template for a pattern of dots. In one embodiment, this includes accessing the data structure 108 with portions of the acquired information to identify corresponding arrangements of dots. The template may thus be built up of a sequence of arrangements of dots, each arrangement including one or more dots, at least some of the arrangements of dots encoding variable information. The arrangements may use spatial relationships between dots, such as distance, direction, angle, size of dots, and/or other features to encode datum values of the variable information.

At S112, one or more patterns 68, 70 are inserted in the scanned digital document 16, e.g., by the pattern insertion component 94, using the template 106 and stored spacing information to determine the placement of the patterns throughout the document. For example, the digital document may be subdivided into a set of blocks and a pattern assigned to some or all of the blocks. The blocks may be examined to ensure that they meet predefined requirements, such as not being too uniform in color, not containing too much color such that the dots could cause the total colorant limit to be exceeded, or where the content could degrade the machine readability of the dots. In other embodiments, dot patterns are inserted in the digital document without consideration of the content of the page. The output of S112 is a modified document 24.

At S114, the modified document 24 may undergo post-processing to prepare it for printing, particularly if these operations have not been performed earlier, such as at S106.

At S116, the modified document 24 is output, e.g., to the printer 30 or to the digital output device 32, such as a fax machine, scan-to-email, USB port, or other digital document output device. The output device outputs the modified document 24, e.g., as a printed sheet 34 in the case of a printer. The exemplary embedding component 20 functions automatically, without any need for input from the user who scans the original document 14. The user may be unaware that the variable data 22 has been embedded in the scanned document. The software components 90, 92, 94, 96 of the embedding component 20 may be protected from inspection and/or modification to prevent or inhibit tampering, e.g., with a software vault.

As will be appreciated, other actions may be performed on the scanned document 16, before or after the variable information 22 is embedded, such as conversion from RGB to CMYK or other color space used by the printer, removal of dust spots, and the like.

In the exemplary embodiment, the output document 34 includes a pattern of yellow dots which are invisible to the unaided eye but which can be read and deciphered by suitable software of the analysis device 64. If the document 34 is subsequently copied, the pattern of dots will also be part of any subsequent printed document.

Figure 6:
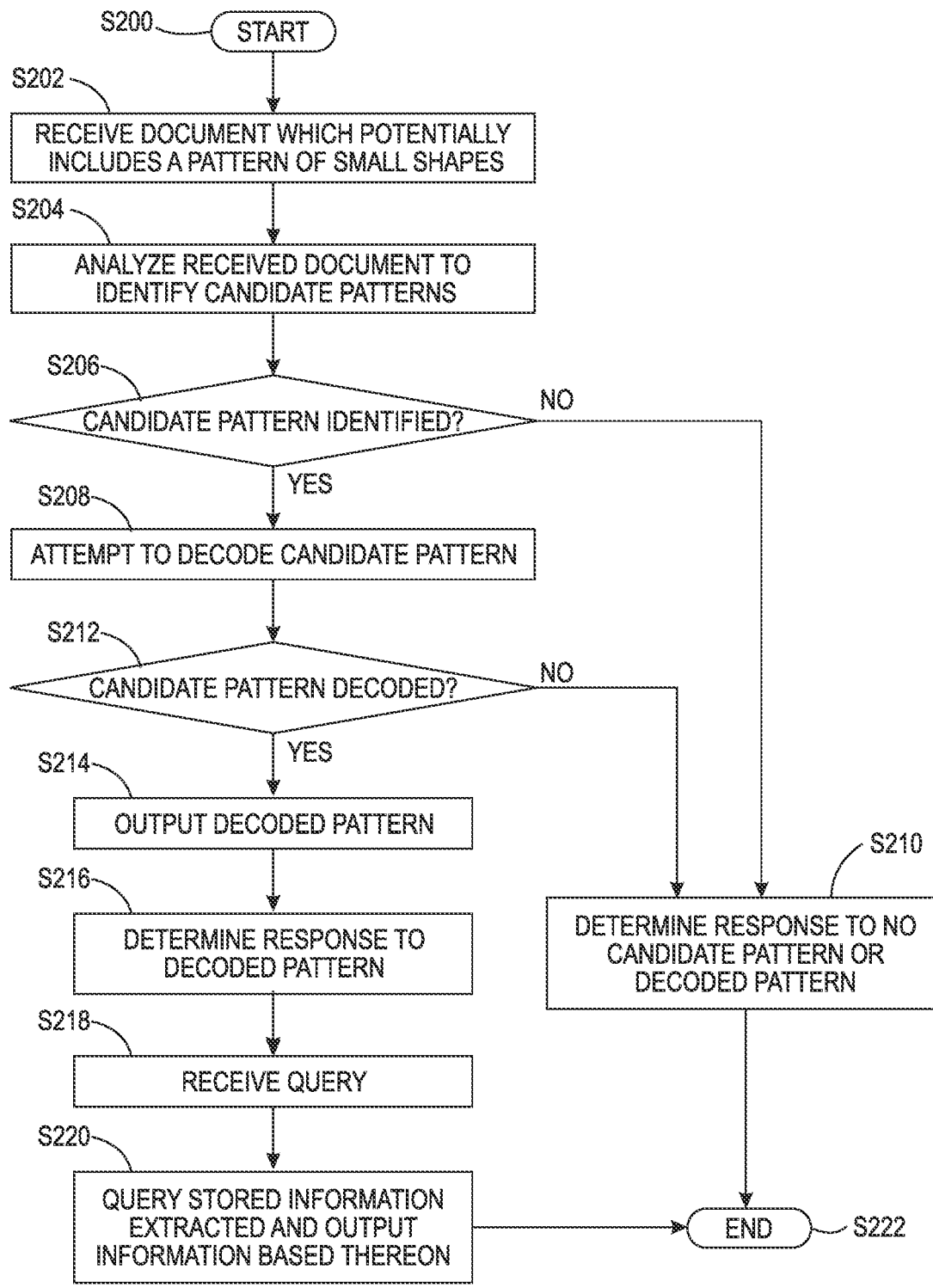
FIG. 6 is a flow chart illustrating a method for extracting information from a hardcopy or digital document, in accordance with another aspect of the exemplary embodiment.

With reference to FIG. 6, a method for extracting embedded information from a hardcopy document, which may be performed with the analysis device 64, is illustrated. The method begins at S200.

At S202, a digital document 112 is received. The digital document 112 may be the output digital document 60, a digital document derived from the output digital document 60, or may be generated by scanning the hardcopy document 34. At the time the hardcopy document 34 is scanned or the digital document 60 is received, it may not be known whether the respective document includes a pattern 68, 70 of dots.

At S204, the scanned or otherwise received document 112 is analyzed to identify candidate patterns of dots. The candidate patterns may be determined from one or more recognizable features. For example, the dots forming the candidate patterns may have a size within a predetermined range (sufficient to allow for small magnifications or size reductions during scanning), and have a shape, arrangement, and/or number of dots expected of a true pattern.

At S206, if a candidate pattern has been identified, the method proceeds to S208, otherwise to S210.

At S208, an attempt is made to decode the candidate pattern, e.g., by matching parts of the candidate pattern with one or more sequences of dots stored in a data structure 138 and at S212, if a match is found, the pattern is decoded and at the information 22 is output at S214. Otherwise, the method proceeds to S210.

At S216, a response is determined, based on the decoded information 22, and stored response instructions. Where a pattern is detected and information 22 is extracted, the response may be to generate and output a report 140 incorporating the information 22. Alternatively, or additionally, the response may involve taking an action, such as preventing the user from printing the document, based on the information 22, or alternatively, allowing printing, e.g., by an authorized user.

At S210, where no candidate pattern is detected or cannot be decoded, the response may be to take no action.

At S218, a query may be received which aims to identify a source of a leaked or otherwise unauthorized document 34. As will be appreciated, the receipt of the query may occur at any time, e.g., before the document 112 is received.

At S220, the stored information 22 from one or more scanned documents 112 may be queried with the query to determine whether a document matching the query has been analyzed by the analysis device and information based on the results of the query may be output. The query may include one or one or more of: the printer ID, the User ID, a time period, and a copy of the original document or an encryption thereof. If a match is found, the document 34 can be traced back to its source.

The method ends at S222.

The systems and methods described herein thus provide added security for highly secret or confidential documents where inappropriate leaking of information may need to be investigated to the source.

The method illustrated in FIGS. 5 and/or 6 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with a computing device (for example, an internal hard drive of RAM), or may be separate (for example, an external hard drive operatively connected with the computing device), or may be separate and accessed via a digital data network such as a local area network (LAN) or the Internet (for example, as a redundant array of inexpensive or independent disks (RAID) or other network server storage that is indirectly accessed by the computing device, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphics card CPU (GPU), or PAL, or the like. In general, any device, capable of implementing a finite state machine that is in turn capable of implementing all or part of the flowchart shown in FIGS. 5 and/or 6, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. An embedding component for embedding information in a scanned document, comprising:
    a document acquisition component which acquires a scanned document of a physical document from an associated scanning device;
    an information acquisition component which acquires variable information associated with the scanned document, the variable information comprising a date/time and one of a device identifier and device location, the device identifier identifying the associated scanning device, the device location identifying a location of the associated scanning device, and the date/time identifying when the physical document was scanned or the scanned document was acquired;
    an encoding component which generates a machine-readable representation of the variable information;
    a pattern insertion component which uses the machine-readable representation to insert at least one machine readable pattern in the scanned document, to generate a modified document;
    an output component which outputs the modified document to an associated output device, such that when the modified document is rendered on print media, the machine-readable pattern is not noticeable to the unaided eye of a person, the machine-readable pattern in the rendered document enabling a source of the document to be identified; and
    a processor which implements the document acquisition component, information acquisition component, encoding component, pattern insertion component, and output component.

2. The embedding component of claim 1, wherein the associated output device is selected from a printer, a digital document output device, and combinations thereof.

3. The embedding component of claim 1, wherein the variable information further comprises a user identifier.

4. The embedding component of claim 1, wherein the machine-readable representation of the variable information comprises a template for the machine-readable pattern.

5. The embedding component of claim 4, wherein the template comprises an arrangement of small shapes.

6. The embedding component of claim 5, wherein the small shapes comprise dots.

7. The embedding component of claim 1, wherein the modified document comprises a plurality of the machine-readable patterns.

8. The embedding component of claim 1, wherein the at least one machine-readable pattern comprises an arrangement of yellow dots.

9. The embedding component of claim 1, wherein each of the at least one machine-readable pattern comprises at least five dots.

10. The embedding component of claim 1, wherein each of the at least one machine-readable pattern comprises up to fifteen dots.

11. The embedding component of claim 1, further comprising a data structure which associates each of a plurality of unique datum values with a respective predefined arrangement of dots, the encoding component accessing the data structure to identify unique datum values that correspond to portions of the variable data and builds the representation from the respective predefined arrangements of dots.

12. The embedding component of claim 1, wherein the scanned document is generated by scanning an original document which lacks machine-readable security information.

13. An embedding system comprising the embedding component of claim 1, the scanning device, and the output device.

14. The embedding system of claim 13, wherein the output device comprises a printer which renders the modified document on print media.

15. The embedding system of claim 13, wherein the output device comprises a digital document output device selected from a fax machine, a scan-to-email device, a USB port, and combinations thereof which outputs the modified document in digital form.

16. An embedding method for embedding information in a document, comprising:
    acquiring a scanned document derived from a first hardcopy document;
    acquiring variable information associated with the scanned document, the variable information comprising a date/time and one of a device identifier and device location, the device identifier identifying a scanning device as the source of the scanned document, the device location identifying a location of the scanning device, and the date/time identifying when the first hardcopy document was scanned or the scanned document was acquired;
    generating a machine-readable representation of the variable information;
    using the machine-readable representation, inserting at least one machine readable pattern in the scanned document, to generate a modified document; and
    outputting the modified document to an output device, such that when the modified document is rendered on print media, the machine-readable pattern is not noticeable to the unaided eye of a person, the machine-readable pattern in the rendered document enabling a location of the scanning device to be identified.

17. The method of claim 16, wherein the generating of the machine-readable representation comprises accessing a data structure which associates each of a plurality of unique datum values with a respective predefined arrangement of dots to identify unique datum values that correspond to portions of the variable data and building the representation from the respective predefined arrangements of dots.

18. The method of claim 16, wherein the inserting of the at least one machine readable pattern in the scanned document comprises embedding patterns in a color separation of the scanned document, each of the patterns comprising an arrangement of small shapes.

19. An analysis device for detecting information embedded in a document, comprising:
- a document acquisition component which acquires a digital document;
- a detection component which identifies candidate patterns of dots in the digital document which each comply with rules for identifying a candidate pattern;
- a decoding component which, for an identified candidate pattern, attempts to match the candidate pattern with one or more sequences of dots stored in a data structure, and if a match is found, decodes the pattern;
- a response generation component which, for a decoded pattern, determines a response, based on the decoded pattern and any stored response instructions, the response including a report;
- a response output component which outputs the response to an appropriate device for executing the response, the report being stored in a report database containing multiple such reports which are accessible through a query; and
- a processor which implements the document acquisition component, detection component, decoding component, response component, and response output component.

20. The analysis device of claim 19, wherein the rules include rules for determining whether an arrangement of small shapes meets predetermined ranges encompassing the expected size, shape, arrangement, and number of dots of a true pattern.

* * * * *